3,396,005
METHODS OF AFFECTING PLANT GROWTH

Ivan C. Popoff, Ambler, Pa., assignor to Pennsalt Chemicals Corporation, Philadelphia, Pa., a corporation of Pennsylvania
No Drawing. Filed Jan. 11, 1965, Ser. No. 424,821
6 Claims. (Cl. 71—70)

ABSTRACT OF THE DISCLOSURE

A method for obtaining plant response effects with compounds having the general structure:

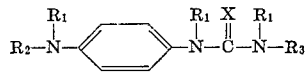

where $R_1$ is a member of the group consisting of alkyl, alkenyl, cycloalkenyl, cycloalkyl, and aryl radicals, $R_2$ is a member of the group of hydrogen, $R_1$ and

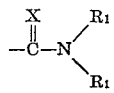

radicals, $R_3$ being selected from the group of $R_1$ and

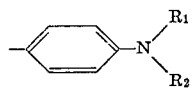

radicals, and X is an atom selected from the group of oxygen and sulfur. $R_1$ will generally contain from one to twelve carbon atoms and will preferably be alkyl.

---

The active compounds used in the invention are disclosed and methods for their preparation are given in U.S. 3,138,571 which issued June 23, 1964 in the name of Ivan C. Popoff. The compounds of the invention may be used as pre-emergent and post-emergent herbicides as well as desiccants and defoliants and will be applied and formulated in the usual manner. The compounds are particularly effective as pre-emergent herbicides for control of weeds and to kill undesired vegetation. The compounds may be used at effective concentrations which will generally range from about 3 pounds to 100 pounds per acre. Preferably the concentrations used will be in the range of 3 to 30 pounds per acre and such concentrations may be used without damaging or destroying the crop. Lower rates can be used, of course, to retard weed growth. Compositions may be formulated as dispersions in water with or without suitable wetting agents which will aid in penetration of plant and soil surfaces. The compound may be made more compatible with water by the addition of water soluble solvents such as ethylene glycol, acetone, diacetone alcohol, methanol, ethanol, and other solvents for the compounds. Suitable water dispersion concentrates may be prepared by ball milling the solid material in water with a suitable wetting and suspending agent such as lignin sulfonate, bentonite, etc. Alternatively, solutions of the agents in organic solvents may be employed for use under field conditions.

Compositions may also be prepared as emulsion concentrates for dilution with water for field applications. These concentrates may be prepared by the use of suitable solvents such as xylene, isophorone, heavy aromatic naphtha, methylated naphthalene, and the like, with the addition of suitable emulsifying agents which are usually blends of various compounds having the proper ratios of oil and water solubility properties and which are stable in the presence of the compound.

Wettable powders may be prepared by direct grinding of the dry compounds with a blend of a suitable dispersing agent such as attapulgite, bentonite, kieselguhr, etc. It is desirable to grind such a blend in a hammer mill so that 99% will pass through a 325-mesh screen. Wettable powders may also be prepared by absorbing a solution of the compound in a solvent such as xylene or acetone on a powdered or granular clay such as attapulgite or diatomaceous earth. All wettable powder preparations should contain a dispersing agent such as a lignin sulfonate and a wetting agent such as an alkylaryl polyether glycol.

The compounds of the invention may also be used to formulate granules of 5 to 20% concentration of active herbicidal ingredient. The user may make application by use of a granular applicator rather than a duster or sprayer and known methods in commercial use are applicable for the preparation of granular formulations.

In general, the formulated compositions will contain from about 1% to about 90% by weight of active agent.
Examples of suitable formulations are as follows:

(I) Aqueous dispersion:

(A)

| | Parts by weight |
|---|---|
| N,N' - bis[3 - (5-methyl)heptyl]-N'',N''-diethyl thiocarbamyl-p-phenylenediamine | 50 |
| Sodium lignosulfonate dispersant | 5 |
| Water | 45 |

(B)

| | |
|---|---|
| Reaction product of N,N' - bis[3 - (5 - methyl) heptyl]-p-phenylenediamine with thiophosgene in 1:1 mole ratio | 20 |
| Sodium lignosulfonate | 5 |
| Water | 75 |

(II) Emulsion concentrate:

| | |
|---|---|
| N,N' - di - sec - butyl - N,N' - bis(diethylcarbamyl)-p-phenylene diamine | 10.0 |
| Xylene | 89.0 |
| Polyether alcohol surfactant ("Triton"-X161) | 1.0 |

The use of the compounds and their formulation in pre-emergent weed control applications on various crops with then be carried out in the usual fashion. Pre-emergent weed control involves the application of the chemical to the soil some time prior to the emergence of the crop. Application can be conveniently made at the same time as the seeding operation and most commonly involves the use of a sprayer attachment to the planter which applies the diluted chemical on the soil surface immediately after covering the seed. Only a band of the seed row may be treated with the herbicide or the whole area may be treated on a broadcast basis. The chemical may or may not be mixed with the first one or two of soil at the time of this application, using a suitable Rototiller type tool.

The pre-emergent herbicides as employed in this invention possess the necessary properties to be effective in field use. Ideally, it should be possible to place a chemical on the soil surface in the zone of germinating weed seeds which are usually above the zone in which the crop plant has been placed. Small weed seeds usually emerge from only the upper inch of soil. However, it is impossible under practical conditions to maintain a separation of the chemical and it is, therefore, necessary for the herbicide to be of a selective type which will control as many undesirable weeds as possible without significant injury to the crop. This requires fairly unique and highly specific properties in the chemical since many of the crop plants are related botanically to weed crops occurring in the same field. The compounds of this invention have these highly selective properties. The herbidices of this invention also have a wide spectrum of weed control, which is desirable because most crops can be infested with many species of both grasses and broad leaf weeds. The pre-emergent herbicides of this invention are adapted for use on specific crop plants and show a high degree of tolerance to many varieties of crops. This tolerance is shown on all types of soils and under various environmental conditions which change the response of the crop to a chemical.

The compositions may also be used in post-emergent applications for weed control where the emerged crop is sufficiently resistant. These applications may be made particularly in the period between emergency and the first cultivation of the crop, but treatments may also be made at later times such as the so-called lay-by treatment after the last possible cultivation to inhibit weed growth up to the time of harvest.

The compounds may also be used as harvest aid chemicals which will either desiccate or defoliate green leaves on susceptible crops and also desiccate any weeds which may be present in order to facilitate the mechanical harvesting with a combine in the case of seed crops. The compounds may also be used in higher doses than normally used for crop application in order to sterilize the soil of all plant growth. Seasonal control of weeds in areas such as industrial sites, roadsides, etc. may be accomplished in this manner.

METHOD OF EVALUATION

A concentrated solution of the product in diacetone alcohol or xylene was dispersed in water and the dispersion was applied to the surface of soil in which seeds of weeds and crops were planted about ½" beneath the surface. After three weeks the emerged plants are observed and the percentage of kill is calculated.

POST-EMERGENCE HERBICIDAL EVALUATION

One month old plants in greenhouse flats were sprayed with an aqueous emulsion or organic solvent solution of the product to be tested and the effect on the plants observed. The following table indicates compounds evaluated in the above tests.

TABLE 1

| Compound | Compound Name | Compound structure |
|---|---|---|
| 1 | N,N'-bis[3-(5-methyl)heptyl]-N,N'-bis-{p-[3-(5-methyl)heptyl]aminophenyl}thiourea. | |
| 2 | N,N'-di-sec-butyl-N-(N'',N''-diethylthiocarbamyl)-p-phenylenediamine. | |
| 3 | Reaction product of N,N'-bis[3-(5-methyl)heptyl]-p-phenylenediamine and phosgene in 1:1 mole ratio. | |
| 4 | N,N'-di-sec-butyl-N,N'-bis(N'',N''-diethylthiocarbamyl)-p-phenylenediamine. | |
| 5 | N,N'-bis[3-(5-methyl)heptyl]-N,N'-bis{p-(5-methyl)heptyl]aminophenyl}urea. | |
| 6 | N,N'-bis[3-(5-methyl)heptyl]-N,N'-bis(N'',N''-diethylcarbamyl)-p-phenylenediamine. | |
| 7 | N,N'-bis[3-(methyl)heptyl]-N-(N'',N''-diethyl-carbamyl)-p-phenylenediamine. | |
| 8 | N,N'-di-sec-butyl-N,N'-bis(p-sec-butylaminophenyl)thiourea. | |
| 9 | N,N'-di-sec-butyl-N,N'-bis(p-sec-butylaminophenyl)urea. | |
| 10 | Reaction product of N,N'-di-sec-butyl-p-phenylenediamine with phosgene in 1:1 ratio. | |

Example 1

Pre-emergence herbicidal effects illustrated in the following Table 2:

TABLE 2.—PRE-EMERGENCE HERBICIDAL ACTIVITY AT 10 LBS./ACRE

Percent Kill

| Compound No.: | Foxtail | Crabgrass | Lambsquarter | Amarantus | Purslane |
|---|---|---|---|---|---|
| 1 | 40 | 50 | 60 | 64 | 55 |
| 3 | 10 | 40 | 30 | 50 | 25 |
| 4 | 0 | 25 | 50 | 65 | ---- |
| 5 | 0 | 50 | 35 | 50 | 50 |
| 6 | 10 | 20 | 0 | 50 | ---- |
| 7 | 25 | 0 | 50 | 65 | 0 |
| 8 | 38 | 22 | 0 | 100 | 60 |
| 9 | 20 | 40 | 79 | 95 | 80 |
| 10 | 25 | 25 | 50 | 20 | 0 |

Example 2

When evaluated against tomato plants at the rate of 5 pounds per acre compound No. 2 desiccated the plants to the extent of 65% in one week.

Example 3

Compound No. 5 was observed at 5 pounds per acre to be an excellent desiccant for lambsquarter giving 100% desiccation in one week and also moderately desiccated bean plants (50 to 70%) in one week. This compound also showed desiccant effects against foxtail, crabgrass, amarantus and purslane at this concentration and time.

Example 4

Compound No. 8 showed 50% defoliation against bean plants at a rate of 5 pounds per acre in one week.

Example 5

Compound No. 10 was active against crabgrass as a post-emergence herbicide at 7.5 pounds per acre showing 90% kill.

Example 6

Compounds which have the general structure

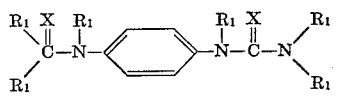

and which show herbicidal effects against various weeds at 10 pounds per acre are:

N,N'-bis[3-(5-methyl)heptyl]-N-(N'',N'''-di-tertbutyl-thiocarbamyl)-p-phenylenediamine,
N,N'-di-dodecyl-N,N'-bis(N'',N'''-di-cyclohexyl-carbamyl)-p-phenylenediamine,
N,N'-di-cyclohexyl-N,N'-bis(N'',N'''-di-n-octylthio-carbamyl)-p-phenylenediamine,
N,N'-di-sec-butyl-N,N'-bis(N'''-methyl,N'''-ethylcarbamyl)-p-phenylenediamine,
N,N'-diphenyl-N,N'-bis(N'',N'''-diethyl carbamyl)-p-phenylenediamine,
N,N'-di-p-tolyl-N,N'-bis(N'',N'''-dimethylthiocarbamyl)-p-phenylenediamine,
N-methyl-N'-phenyl-N,N'-bis(N'',N'''-dimethylcarbamyl)-p-phenylenediamine,
N,N'-diphenyl-N-(N'',N'''-dimethylcarbamyl)-p-phenylenediamine,
N,N'-diallyl-N,N'-bis(N'',N'''-diethylthiocarbamyl)-p-phenylenediamine,
N,N'-di-sec-butyl-(N'',N'''-diallylthiocarbamyl)-p-phenylenediamine, and
N,N'-di(methallyl)-N-(N'',N'''-diethylthiocarbamyl)-p-phenylenediamine.

Example 7

Compounds which have the general structure

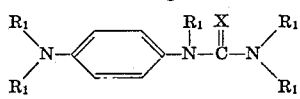

and which affect plant growth are:

N,N'-diethyl-N-(N'',N'''-dimethylcarbamyl)-p-phenylenediamine,
N,N,N'-tri-sec-butyl-N'-(N'',N'''-di-n-propylcarbamyl)-p-phenylenediamine,
N,N'-didodecyl, N-sec-butyl-N'-(N'',N'''-diethyl-thio-carbamyl)-p-phenylenediamine,
N,N,N'-tris-[3-(5-methylheptyl)]-N'-(N'',N'''-dicyclohexylthiocarbamyl)-p-phenylenediamine, and
N-methyl-N,N'-diphenyl-N'-(N'',N'''-diethylcarbamyl)-p-phenylenediamine.

I claim:

1. The method of obtaining herbicidal effects on plants which comprises contacting said plants with an effective amount of a compound having the structure

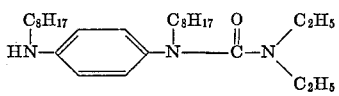

2. The method of obtaining herbicidal and desiccant effects on plants which comprises contacting said plants with an effective amount of a compound having the structure

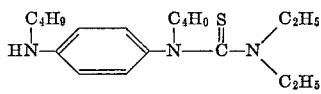

3. The method of obtaining herbicidal and desiccant effects on plants which comprises contacting said plants with an effective amount of a compound of structure

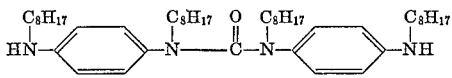

4. The method of obtaining herbicidal effects on plants which comprises contacting said plants with an effective amount of a compound of structure

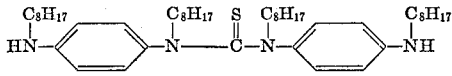

5. The method of obtaining herbicidal and defoliant effects on plants which comprises contacting said plants with an effective amount of a compound of structure

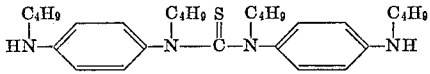

6. The method of obtaining herbicidal effects on plants which comprises contacting said plants with an effective amount of a compound of structure
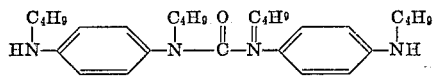
References Cited
UNITED STATES PATENTS
3,138,571  6/1964  Popoff _____ 260—552
3,184,301  5/1965  Martin et al _____ 71—2.6
LEWIS GOTTS, *Primary Examiner.*
G. G. HOLLRAH, *Assistant Examiner.*